United States Patent
Jenkins et al.

(10) Patent No.: US 11,965,859 B1
(45) Date of Patent: Apr. 23, 2024

(54) SYSTEM AND METHOD FOR EMPIRICAL ESTIMATION OF LIFE REMAINING IN INDUSTRIAL EQUIPMENT

(71) Applicant: DISCOVERY SOUND TECHNOLOGY, LLC, Nashville, TN (US)

(72) Inventors: John Jenkins, Nashville, TN (US); Michael Pedersen, Nashville, TN (US); Jon Harper, Fort Mill, SC (US)

(73) Assignee: Discovery Sound Technology, LLC, Nashville, TN (US)

( * ) Notice: Subject to any disclaimer, the term of this patent is extended or adjusted under 35 U.S.C. 154(b) by 338 days.

(21) Appl. No.: 17/529,658

(22) Filed: Nov. 18, 2021

Related U.S. Application Data

(60) Provisional application No. 63/115,080, filed on Nov. 18, 2020.

(51) Int. Cl.
| | | |
|---|---|---|
| *G06F 11/30* | (2006.01) | |
| *G01N 29/14* | (2006.01) | |
| *G01N 29/24* | (2006.01) | |
| *G08B 21/18* | (2006.01) | |
| *H04R 17/02* | (2006.01) | |
| *H04R 29/00* | (2006.01) | |

(52) U.S. Cl.
CPC ......... *G01N 29/14* (2013.01); *G01N 29/2437* (2013.01); *G08B 21/18* (2013.01); *H04R 17/02* (2013.01); *H04R 29/008* (2013.01)

(58) Field of Classification Search
CPC .................................................. G01N 29/14
See application file for complete search history.

(56) References Cited

U.S. PATENT DOCUMENTS

| | | |
|---|---|---|
| 4,287,581 A | 9/1981 | Neale, Sr. |
| 4,658,245 A | 4/1987 | Dye et al. |
| 4,987,769 A | 1/1991 | Peacock et al. |
| 5,103,675 A | 4/1992 | Komninos |
| 5,432,755 A | 7/1995 | Komninos |
| 5,436,556 A | 7/1995 | Komninos |
| 5,445,026 A | 8/1995 | Eagan |
| 5,710,377 A | 1/1998 | Youngquist et al. |

(Continued)

*Primary Examiner* — Phuong Huynh
(74) *Attorney, Agent, or Firm* — Patterson Intellectual Property Law PC

(57) ABSTRACT

System and methods are provided for empirical analysis of remaining life in electromechanical devices. Sensors are positioned to generate signals representing sound energy emitted by devices, and digital sound data are stored corresponding thereto. The system classifies sound characteristics and their corresponding impact on wear rate over time via recurring analysis of the stored sound data. For a selected device, a wear state is estimated based on a comparison of current sound energy emitted therefrom with respect to sound data for a comparable group of electromechanical devices, and it may be ascertained whether certain classified sound characteristics are present in digital sound data corresponding to the selected electromechanical device. Output signals are selectively generated based on the estimated wear state and/or classified sound characteristics ascertained to be present, e.g. providing indicators of said sound characteristics in association with the digital sound data, and/or providing notification of detected intervention events.

8 Claims, 3 Drawing Sheets

(56) References Cited

U.S. PATENT DOCUMENTS

| | | |
|---|---|---|
| 5,854,422 A | 12/1998 | McKeon et al. |
| 5,955,670 A | 9/1999 | Goodman et al. |
| 6,057,959 A | 5/2000 | Taylor et al. |
| 6,058,076 A | 5/2000 | Komninos |
| 6,079,275 A | 6/2000 | Komninos |
| 6,163,504 A | 12/2000 | Komninos et al. |
| 6,175,934 B1 | 1/2001 | Hershey et al. |
| 6,220,098 B1 | 4/2001 | Johnson et al. |
| 6,247,353 B1 | 6/2001 | Battenberg et al. |
| 6,295,510 B1 | 9/2001 | Discenzo |
| 6,301,514 B1 | 10/2001 | Canada et al. |
| 6,658,373 B2 | 12/2003 | Rossi et al. |
| 6,666,093 B2 | 12/2003 | Morganti |
| 6,701,725 B2 | 3/2004 | Rossi et al. |
| 6,766,692 B1 | 7/2004 | Eagan |
| 6,775,576 B2 | 8/2004 | Spriggs et al. |
| 6,782,345 B1 | 8/2004 | Siegel et al. |
| 6,809,642 B1 | 10/2004 | Brenner |
| 6,923,063 B2 | 8/2005 | Komninos |
| 6,973,793 B2 | 12/2005 | Douglas et al. |
| 6,978,675 B2 | 12/2005 | Eagan |
| 7,016,742 B2 | 3/2006 | Jarrell et al. |
| 7,051,577 B2 | 5/2006 | Komninos |
| 7,079,967 B2 | 7/2006 | Rossi et al. |
| 7,099,852 B2 | 8/2006 | Unsworth et al. |
| 7,181,297 B1 | 2/2007 | Pluvinage et al. |
| 7,308,385 B2 | 12/2007 | Wegerich et al. |
| 7,540,183 B2 | 6/2009 | Komninos |
| 7,580,781 B2 | 8/2009 | Mindeman |
| 7,603,586 B1 | 10/2009 | Skladanowski et al. |
| 8,014,549 B2 | 9/2011 | Kates |
| 8,024,938 B2 | 9/2011 | Rossi et al. |
| 8,059,833 B2 | 11/2011 | Koh et al. |
| 8,245,576 B2 | 8/2012 | Komninos |
| 8,468,874 B2 | 6/2013 | Komninos |
| 8,495,914 B2 | 7/2013 | Izikoff |
| 8,872,652 B2 | 10/2014 | Komninos |
| 8,872,654 B2 | 10/2014 | Komninos |
| 9,084,050 B2 | 7/2015 | Hillis et al. |
| 10,145,761 B1 | 12/2018 | Jenkins et al. |
| 2002/0152056 A1 | 10/2002 | Herzog et al. |
| 2003/0209077 A1 | 11/2003 | Battenberg et al. |
| 2004/0102928 A1 | 5/2004 | Cuddihy et al. |
| 2004/0112136 A1 | 6/2004 | Terry et al. |
| 2004/0136539 A1 | 7/2004 | Uhi et al. |
| 2004/0158474 A1 | 8/2004 | Karschnia et al. |
| 2005/0096873 A1 | 5/2005 | Klein |
| 2005/0126264 A1 | 6/2005 | Komninos |
| 2006/0053867 A1 | 3/2006 | Stumpf |
| 2006/0135907 A1* | 6/2006 | Remde ............ A61M 5/16831 604/67 |
| 2006/0164097 A1 | 7/2006 | Zhou et al. |
| 2006/0265261 A1 | 11/2006 | Wetzer et al. |
| 2007/0028693 A1 | 2/2007 | Komninos |
| 2007/0109137 A1 | 5/2007 | Farrel |
| 2007/0109138 A1 | 5/2007 | Farrell |
| 2007/0112528 A1 | 5/2007 | Farrell |
| 2008/0147356 A1 | 6/2008 | Leard et al. |
| 2009/0091441 A1 | 4/2009 | Schweitzer, III et al. |
| 2009/0196431 A1 | 8/2009 | Gregg |
| 2010/0023585 A1 | 1/2010 | Nersu et al. |
| 2010/0039271 A1 | 2/2010 | Izikoff et al. |
| 2010/0067708 A1* | 3/2010 | Groth ................ H04L 67/14 381/56 |
| 2010/0097057 A1 | 4/2010 | Karpen |
| 2010/0307860 A1 | 12/2010 | Ellingson |
| 2011/0022346 A1 | 1/2011 | Rossi et al. |
| 2011/0055669 A1 | 3/2011 | Dehaan et al. |
| 2011/0074589 A1 | 3/2011 | Han et al. |
| 2012/0035802 A1 | 2/2012 | Suzuki et al. |
| 2012/0076333 A1 | 3/2012 | Bäuml et al. |
| 2012/0230482 A1 | 9/2012 | Gavillet |
| 2013/0003981 A1 | 1/2013 | Lane |
| 2013/0046714 A1 | 2/2013 | Harris |
| 2013/0063262 A1 | 3/2013 | Shaikh et al. |
| 2013/0177164 A1 | 7/2013 | Glebe |
| 2013/0283890 A1 | 10/2013 | Komninos |
| 2014/0114612 A1 | 4/2014 | Yoskovitz et al. |
| 2014/0309549 A1 | 10/2014 | Selig et al. |
| 2014/0334644 A1 | 11/2014 | Selig et al. |
| 2015/0078575 A1 | 3/2015 | Selig et al. |
| 2016/0100265 A1 | 4/2016 | Maggiore et al. |
| 2016/0100266 A1 | 4/2016 | Propp |
| 2016/0302019 A1* | 10/2016 | Smith ................ G01M 99/005 |

* cited by examiner

SYSTEM AND METHOD FOR EMPIRICAL ESTIMATION OF LIFE REMAINING IN INDUSTRIAL EQUIPMENT

CROSS-REFERENCES TO RELATED APPLICATIONS

This application claims benefit of U.S. Provisional Patent Application No. 63/115,080, filed Nov. 18, 2020, and which is hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

The present invention relates generally to the field of utilizing ultrasound emissions for analyzing the state of industrial equipment. More particularly, the present invention relates to a system and method for locally collecting sound data from distributed industrial equipment and diagnosing the sound data for a wide array of industrial equipment for empirical determinations of wear and life remaining that may be used as the basis for corrective action/preventative maintenance programs.

BRIEF SUMMARY

Systems and methods in accordance with the present disclosure collect at least sound data files from equipment across a number of distributed locations and properties, and leverage the collected data and aggregated variables derived therefrom to perform wear/remaining life analysis and recommend corrective action as needed.

Such systems and methods may advantageously improve on conventional human-implemented evaluations at least with respect to cognitive bias in human hearing. Systems and methods as disclosed herein may encode and extend the experience of an expert by listening and focusing on multiple aspects of an individual reading more attentively than an expert human could. Sound signature classifications may be useful at least because of their consistency and for the fact that the system generating them never tires, unlike an expert who may only be able to classify thousands of readings accurately in a single day. The disclosed system can process many readings simultaneously, faster than in real time, and consistently maintain the same level of accuracy. An expert faces the cognitive limit of paying attention to over twenty individual types of sound that may occur in any given reading. Many sound classifications include background sounds that are inherently difficult for humans to recognize, especially when there are more dominant sounds obscuring those background aspects. Age-related hearing loss for differentiating high pitches and quieter sounds also disproportionately impacts human experts, which makes it even harder to classify readings with low level background sounds accurately or consistently. Systems and methods as disclosed herein may accordingly enable a technician having for example a functional Wi-Fi or cellular connection to have access to valuable diagnostic information, in real time, to validate that equipment is in good health or otherwise predict equipment failures by identifying issues that if resolved can extend equipment life.

Systems and methods as disclosed herein may further advantageously improve on conventional human-implemented evaluations with respect to consistency across equipment and the scale of data examples. The population of sound energy values used to determine the percentage of life remaining (PLR) takes into account more features than an expert in the field can consciously use to evaluate the state of a particular piece of equipment. The PLR determinations according to the present disclosure may implement sound energy values for thousands of similar equipment types in many configurations and varying conditions, effectively encoding the experience an expert receives over the course of their career. Computer-implemented sound energy analysis enables a consistent way to analyze wasted energy across equipment types and models. This consistency smooths out any of the individual differences that an expert would have to learn, subconsciously or consciously, for each type of equipment. Complexity of each equipment type may substantially limit how many types of electromechanical equipment an expert can reasonably and knowledgeably diagnose, while the PLR calculation using data models and aggregated sound energy leveraging as disclosed herein can scale to an unlimited number of equipment models and types.

In an embodiment as disclosed herein, an exemplary system is provided for empirical analysis of remaining life in electromechanical devices. One or more sensors generate signals representing sound energy emitted by electromechanical devices when positioned in association therewith. Digital sound data corresponding to generated signals for each of a plurality of electromechanical devices are stored in memory, databases, or equivalent data storage. At least one server is functionally linked to the one or more sensors and the data storage and classifies sound characteristics and their corresponding impact on wear rate over time via recurring analysis of the stored sound data. The at least one server further, for a selected electromechanical device, estimates a wear state of the selected electromechanical device based on a comparison of current sound energy emitted therefrom with respect to sound data for a comparable group of electromechanical devices, ascertains whether one or more of the classified sound characteristics are present in digital sound data corresponding to the selected electromechanical device, and selectively generates one or more output signals based on the estimated wear state and/or classified sound characteristics ascertained to be present.

In one exemplary aspect according to the above-referenced embodiment, a plurality of groups of electromechanical devices are determined at least in part based on magnitude of sound energy emitted therefrom, and the wear state is estimated based on a comparison of a magnitude of the current sound energy emitted therefrom with respect to the magnitudes of sound data for the comparable group of electromechanical devices.

In another exemplary aspect according to the above-referenced embodiment, the wear state corresponds to a predicted life remaining for the selected electromechanical device.

In another exemplary aspect according to the above-referenced embodiment, a confidence level is further ascertained associated with the wear state estimation.

In another exemplary aspect according to the above-referenced embodiment, a variant wear rate is ascertained for the selected electromechanical device based on one or more classified sound characteristics ascertained as being present in the digital sound data corresponding thereto.

In another exemplary aspect according to the above-referenced embodiment, the one or more output signals are provided to generate visual indicators associated with the digital sound data and representative of the ascertained one or more of the classified sound characteristics.

In another exemplary aspect according to the above-referenced embodiment, the one or more output signals are provided to alert and/or initiate a response corresponding to a detected intervention event associated with the variant wear rate and a change in predicted wear state based thereon.

In another exemplary aspect according to the above-referenced embodiment, a confidence level is determined with respect to the ascertained variant wear rate and/or the ascertained presence of one or more of the classified sound characteristics in the digital sound data corresponding thereto, and the one or more output signals are selectively generated upon the confidence level reaching and/or exceeding a predetermined confidence threshold.

In another aspect, systems and methods as disclosed herein may generate a user interface which enables authorized users to monitor an operative wear state of the electromechanical device, and/or any ascertained sound characteristics as for example provided as "tags" with respect to the digital sound data.

In another aspect, systems and methods as disclosed herein may for example transmit alerts regarding detected intervention events (based, e.g., on predicted failure or substandard operation of the electromechanical device) via a communications network to an endpoint device associated with an authorized user.

DETAILED DESCRIPTION

Figure 1:
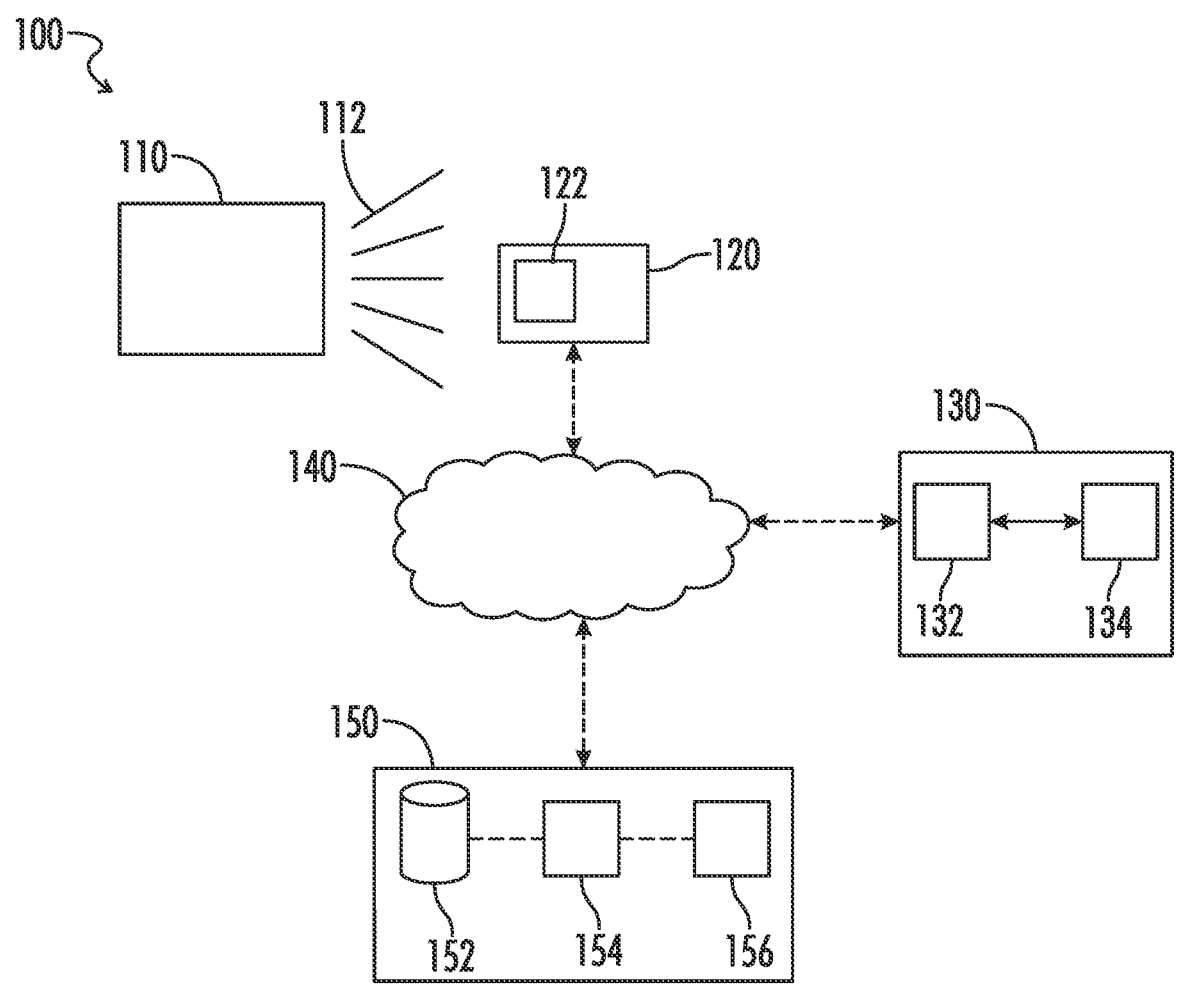
FIG. 1 is a block diagram representing an exemplary embodiment of a system as disclosed herein.

Referring generally to the aforementioned figures, various exemplary embodiments may be described herein for a system and method for remotely collecting sound data and diagnosing issues in respective industrial equipment. Where the various figures may describe embodiments sharing various common elements and features with other embodiments, similar elements and features are given the same reference numerals and redundant description thereof may be omitted below.

Referring more particularly to FIG. 1, an embodiment of a system 100 according to the present disclosure includes an electromechanical device 110 to which a sound detection device 120 is operatively connected or respective to which it may be selectively positioned. The sound detection device may comprise one or more transducers 122 effective to periodically or continuously receive at least signals corresponding to sound energy 112 from the electromechanical device and convert corresponding analog signals into digital sound data. The sound detection device may further be effective to generate one or more digital data files based upon the received sound signals, predefined parameters, or other variable inputs, such that the digital data files comprise the digital sound data, the type of electromechanical device to which the sound detection device is operatively connected or proximately located, and the location of the electromechanical device and/or sound detection device.

The state of the signals being processed herein is not limited to any one example unless otherwise specifically stated, and it is generally understood that methods as disclosed herein may be implemented using, e.g., ultrasound information processed either in its base ultrasound form, a digital signal processing output form, or a heterodyned form of the raw signals with respect to the hearing parameters of a particular individual.

The terms "electromechanical device" 110 or "electromechanical equipment" 110 as interchangeably used herein are not limited in scope with respect to a particular field of use, but generally refer within the scope of the present invention to electrical or electromechanical devices, components, or systems that generate or emit sound energy representative of flaw, excessive wear, and/or failure (e.g., creating measurable changes in air pressure based on changes in work intensity), and may typically include, without limitation, transformers, switching power converters, air compressors, boilers, chillers, air condensing units, cooling towers, pumps, motors, fans, piston compressors, reciprocal compressors, and the like.

In certain embodiments, one or more of the sound detection device 120 and the one or more transducers 122 may be installed as original-equipment-manufactured components of the electromechanical device 110. In alternative embodiments, the sound detection device and transducer may comprise a functional sound detection module installable as an aftermarket component in or relative to the electromechanical device. In said embodiments, the type of electromechanical device and location of the electromechanical device or sound detection device may be predefined in accordance with the installation of the component or module. In other embodiments, some sound detection devices 120 may be portable in nature and utilized to selectively provide respective sound data with respect to different electromechanical devices 110. An exemplary system as disclosed herein may be capable of utilizing sound input data from any combination of the above-referenced types of sound detection devices 120.

In certain embodiments, the sound detection device 120 may further be able to transmit the analog signals, digital sound data, and/or the digital data files (depending for example on whether or not the digital conversion is provided by the sound detection device itself or downstream) across a communications network 140 to a host server 150. In one embodiment, the sound detection device may transmit digital data files across the Internet by means of a modem to an Internet-connected monitoring server 150. In an alternative embodiment, the sound detection device may transmit digital data files on a local intranet network to a local host server 150. In further embodiments, the digital sound data or the data files may be downloadable from the sound detection device to a portable data storage for selective transmittal and downloading to the host server, or otherwise selectively connected to the host server via a wired connection for data transmittal there between. In yet another embodiment, the sound detection device may at least temporarily retain the digital sound data and digital data files in storage thereon, wherein the server is at least periodically connected to the sound detection device for accessing and processing the data without requiring transmittal of the data from the local storage to a data storage associated with the server itself.

The server(s) 150 may be configured to receive input from a plurality of sound detection devices 120 or other automated monitoring devices and provide a centralized point of feedback for the performance and operation of one or more electromechanical systems 110.

In certain embodiments, the server 150 (or alternatively, a plurality of functionally and/or communicatively linked servers) may include or otherwise implement a database 152, a computer-readable medium 154 having program instructions such as for example spectral analysis software residing thereon, and executable by a processor 156. In execution of a method according to the present invention, the server may be linked to or otherwise access an external data storage, for example a database which may be associated with a remote data source in addition to any hosted or otherwise local database or databases residing on or in association with the server(s).

The term "computer-readable medium" as used herein may refer to any non-transitory memory or storage medium or as one of a plurality of non-transitory memory or storage media within which is embodied a computer program product that includes processor-executable software, instructions, program modules, etc., which upon execution may provide data or otherwise cause a computer system to implement subject matter or otherwise operate in a specific manner as further defined herein. It may further be understood that more than one type of computer readable medium may be used in combination to conduct processor-executable software, instructions, program modules, etc., from a first medium upon which the software, instructions, program modules, etc., initially reside to a processor for execution.

In certain embodiments, the processor 156 may execute software instructions stored on the computer-readable medium 154 effective to receive the digital data files via the network 140 and store said digital data files in the database 152. The processor may further execute software instructions stored on the computer-readable medium effective to perform various operations and/or steps as further described below at least with respect to method 200. In alternative embodiments, one or more of the operations and/or steps as further described below at least with respect to method 200 may be executed by other sound detection devices and/or user computing devices in addition to or instead of the server(s).

In certain embodiments, the processor 156 may send alerts or other messages across the communications network 140 to an endpoint device 130 associated with a monitoring user. An endpoint device processor 132 may be effective to receive the alert from the communications network and display the alert within a user interface generated on a display device 134 associated with the endpoint device. Certain embodiments of the endpoint device may include, for example, a personal computer, a smart phone, a tablet computer, a specialized diagnostic device, a control module for the electromechanical device, and the like.

In further certain embodiments, the endpoint device 130 may execute computer program instructions upon user initiation to generate a user interface 134 including dashboards and associated program tools for purposes of displaying the generated alert. In another embodiment, the display device may be associated with the server 150 in configuration as a control device, monitoring device, or host device for a plurality of sound detection devices 120.

Whereas the aforementioned embodiments may refer to the transmittal or otherwise obtaining of sound data from the sound detection device 120 for the purpose of processing and analysis by the remote server, it may be understood that in certain embodiments (not shown) the sound detection device 120 itself may be configured with a display unit, processor and one or more computer readable media having the requisite program instructions residing thereon for executing any or all of the functions recited herein for customized presentation of sound data at the site of the electromechanical equipment. In certain such embodiments, the sound detection device 120 and the personal mobile computing device 130 may be integrated within effectively the same device housing or may operate in association with each other without requiring data transmittal to or from a host server.

The term "user interface" as used herein may, unless otherwise stated, include any input-output module by which a user device facilitates user interaction with respect to at least the hosted server including, but not limited to, web browsers; web portals, such as individual web pages or those collectively defining a hosted website; telephony interfaces such as interactive voice response (IVR); and the like. Such interfaces may in a broader sense include pop-ups or links to third party websites for the purpose of further accessing and/or integrating associated materials, data, or program functions via the hosted system and in accordance with methods of the present invention. A user interface may further be described with respect to a sound detection device or personal mobile computing device in the context of buttons and display portions which may be independently arranged or otherwise interrelated with respect to, for example, a touch screen, and may further include audio and/or visual input/output functionality even without explicit user interactivity.

Figure 3:
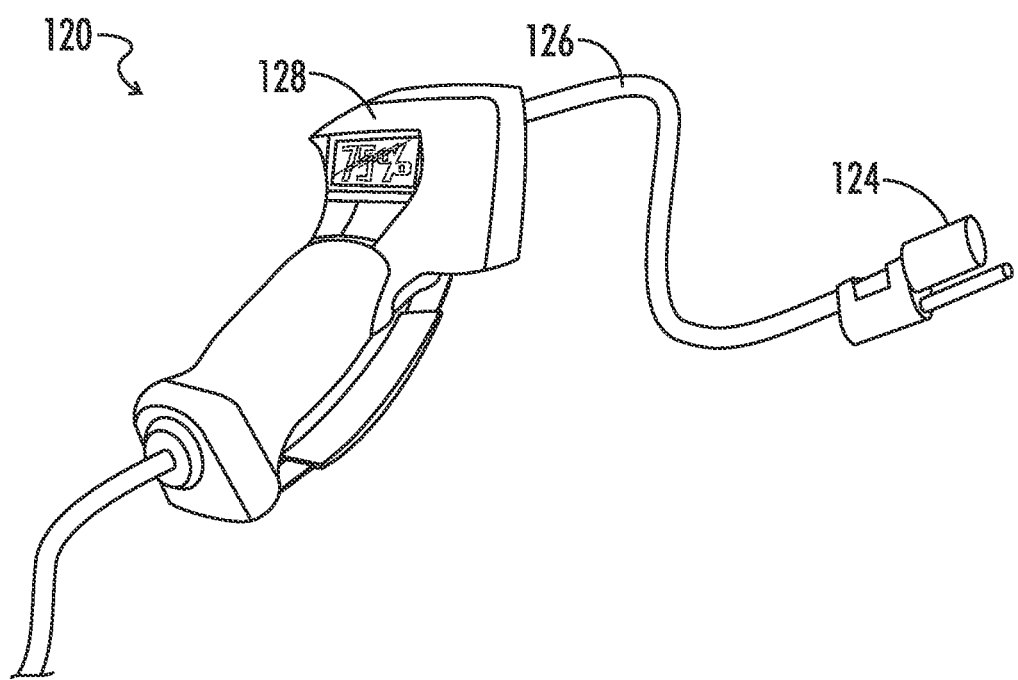
FIG. 3 is an isometric view of one embodiment of a sound detection device according to the system of FIG. 1.

In a particular and exemplary embodiment a portable sound detection device 120 as represented in FIG. 3 may be implemented instead of a fixed device, such a device including for example an ultrasound measurement unit with a portable housing about or within which is disposed a flexible tube 126, a sound cup 124 on a distal end of the flexible tube relative to the housing, a display portion 128, user interface components such as buttons, dials, etc., and actuators such as for example a trigger-style button.

Generally stated, one or more piezoelectric transducers 122 disposed within the flexible tube 126 may be effective to receive analog ultrasound signals and convert the signals to electrical (digital) impulses that are then filtered and amplified by appropriate circuitry and digital logic components. The sound detection device 120 may in certain embodiments generate sound data files based on the filtered and amplified digital impulse signals for internal measurement, conversion and display, and further for external transmission to the remote server 150 or other device for storage and analysis as further described below. Various embodiments of the device may further or alternatively convert the filtered and amplified digital impulses back to analog signals for user examination of the represented sound data via an audio output mechanism such as for example noise attenuating headphones or an equivalent.

A system as disclosed herein does not require the specific features of any exemplary sound detection devices 120 as disclosed herein, unless otherwise specifically stated. A sound detection device within the scope of the present invention may for example include a sound detection module (not shown) that is permanently or semi-permanently affixed to the electromechanical equipment, with one or more sound collecting elements (e.g., non-contact transducers) 122 positioned accordingly. In one embodiment, a transducer 122 in accordance with a sound detection module may be mounted with respect to the electromechanical device 110 at a 0° angle of reference such that the transducer receives sound waves perpendicular to the surface of the electromechanical device 110. The transducer may further be isolated from physical vibrations and other relevant effects generated by the electromechanical device 110 via a shroud formed of a material such as elastic, situated between the electromechanical device 110 and the transducer. The shroud may preferably have high form retention characteristics and effective to return the transducer to the preferred 0° angle of reference upon dislocation by, e.g., physical vibration. The transducer may be operatively connected to the sound detection device 120 by means of a sound dampening tube of a length corresponding to a distance between the desired mounting position and the module. Such affixed devices may be configured to continuously collect and transmit sound data over time, or to store and periodically transmit sound data.

Figure 2:
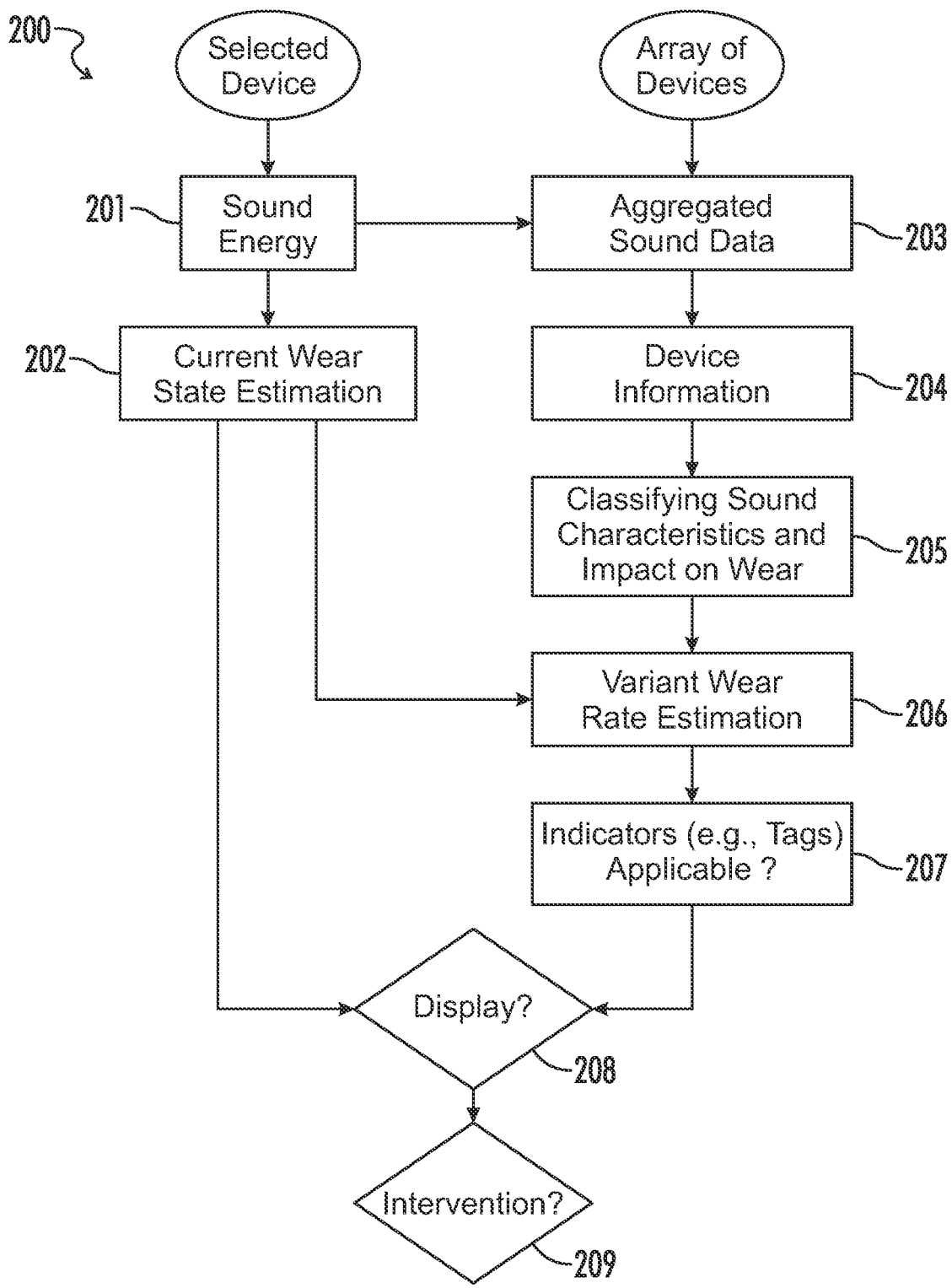
FIG. 2 is a flowchart representing an exemplary embodiment of a method as disclosed herein.

Referring now to FIG. 2, an exemplary method 200 and corresponding series of steps for empirical wear analysis of an electromechanical device 110 may be described in association with at least the embodiment of a system 100 represented in FIG. 1 and described above.

The method 200 begins at a first step 201 when a sound detection device 120 receives analog sound signals associated with the operation of a selected electromechanical device 110. In certain embodiments, the sound detection device may convert the analog sound signal to digital sound data, which analog-to-digital conversion may for example be achieved by means of one or more transducers. The sound detection device may further determine identity inputs comprising at least location information and electromechanical device type based upon one or more parameters. The location information may for example pertain to the location of the sensor, and/or to the location of the electromechanical device. In further embodiments, the electromechanical device type may be determined from a plurality of predetermined makes and models of electromechanical devices. The identity inputs may be predefined in accordance with the installation of the sound detection device, or alternatively, the sound detection device may determine the identity inputs from signals received via the transducers or via other sensors. The sound detection device may associate the digital sound data with the determined identity inputs and generate one or more digital data files comprising the digital sound data and the identity inputs. The sound detection device transmits the analog signals, digital data files, or the like to one or more servers 150 across a communications network, although as noted herein it may be understood that the downstream analytics may alternatively be performed at an endpoint device 130 or even by the sound detection device itself wherein no transmittal of data files to the server is necessary.

In step 202, the captured sound energy provides population data that enables estimation of a wear state of the selected device, for example in the context of statistical definition as to where a specific inspection falls on a distribution of the plurality of electromechanical devices. In an embodiment, the estimation may be based for example on a magnitude value of the energy being emitted versus a randomly gathered set of magnitude values for comparable inspections.

Once the data set is large enough, a specific inspection and associated wear state estimation may be classified with corresponding confidence as to which group of values it best fits. As but one example, the requisite size of data sets may include 100 for 1-sigma, 1000 for 2-sigma, 10 thousand for 3-sigma, etc. The specific inspection can thusly be classified with corresponding confidence as to what group of values it belongs in, e.g., 0-50% (below media), 51-85% (one sigma over media), 85-95% (2-sigma), and 95% (3+ sigma). The system may then define these groups in terms of percentage of life remaining (PLR), which may for example include "groups" such as a first group associated with 50% PLR or greater, a second group between 15% and 49% PLR, a third group between 5% and 15%, and a fourth group with less than 5% PLR.

This step may be useful in that it provides a sense of the "age" of the electromechanical equipment based on empirical evidence, as opposed to simply relying upon the date of manufacture or date of installation. Each equipment manufacturer may be expected to provide parameters with expected life for each part, but the above-referenced data and characterizations may add another important input into ascertaining the presence of an intervention event, e.g., a decision about whether to repair or replace some or all of the selected equipment.

Returning to FIG. 2, in step 203 the server 150 receives the analog signals and/or digital data files from the sound detection device 120. The system may further have previously stored, or otherwise made accessible, information corresponding to each of a plurality of electromechanical devices including the selected device (step 204). In certain such information may include or otherwise provide the basis for statistical analysis to determine, e.g., average sound energy values for each electromechanical device, component thereof, and/or and individual point within said component to define a baseline which may further be defined for example as an average condition for a functioning piece of equipment. Such information may for example include an initial expected wear rate for the type of device at issue, which may be useful as a baseline or point of comparison for subsequently and empirically developed wear states or wear rates.

In certain embodiments, the server may be configured to receive files from a plurality of sound detection devices 120 in association with one or more electromechanical devices 110. In an embodiment, the server may be employed as an Internet-connected monitoring device for a host user to monitor the ongoing performance of certain electromechanical devices associated with clients across a broad geography. In another embodiment, the server may function as an on-site monitoring device for one or more electromechanical devices within a given geographical location, such as, for example, an office building or industrial complex. The receipt of the files may be performed either periodically or continuously.

The method 200 further includes classifying sound characteristics and their correlation with device wear over time (step 205), estimating a variant wear rate as for example differing from the initial and predetermined wear rate for the selected device (step 206), and providing any applicable one or more indicators such as tags which may be associated with the digital sound data for user decision support (step 207). The estimated current wear state (i.e., "age") of a particular electromechanical device based on emitted sound energy may not provide an adequate picture as to other immediate conditions that may accelerate or delay additional wear and/or aging of the equipment over time. Trend charts are conventionally known as one input that can be implemented, but the present disclosure further includes the ascertainment of specific characteristics in the sound recording of the inspection.

The system as disclosed herein may define and classify specific characteristics of sound energy into groups or classes that can then be correlated or otherwise identified with respect to a common condition (i.e., loose, damaged, arcing, rotating, etc.). One of skill in the art may appreciate that numerous machine learning techniques as known in the art may be modified as needed to implement steps disclosed herein, e.g., to classify sound characteristics associated with a sound signature for the selected device. The specified classes may represent one or more conditions that will accelerate or delay the wear of the equipment.

A variant wear rate as described herein may generally represent any alteration from an initial wear rate (or previously determined variant wear rate) for the selected device, based on input sound data collected from the selected device. In an embodiment, an initial wear rate for the selected device may be visually exemplified as a curve from an initial wear state to an expected end of life, with various intervening wear states and corresponding percentages of expected life remaining. As sound data is collected and analyzed over time, as previously noted the method 200 includes estimating current wear states which may further indicate where the selected device is currently along the initial wear rate curve. This position along the curve and corresponding rate of aging for the selected device may understandably be slower or faster than expected, and current wear state is one effective tool for recognizing the pace of wear to date. The variant wear rate may be implemented as a further predictive tool which dynamically alters the initial (or previously determined) wear rate curve, in view for example of the actual wear rates that can be identified with respect to comparable equipment over time, from an equivalent current wear state moving forward.

In an embodiment, one of more indicators corresponding to a given class can then be applied to each appropriate sound signature recording based on, e.g., use of Bayesian statistics to define a level of confidence that the characteristic of a sound is present in any individual recording. The level of confidence may for example be represented as a percentage. These indicators may represent true-positives and true-negatives for the presence of any specific class of sounds, wherein for example a true-positive indicator represents that the corresponding sound characteristic is statically present in the recording according to the resulting posterior value of the Bayesian statistics. The indicators may be presented as tags, some of can further for example be considered a "risk factor" or "co-morbidity factor" in the assessment of the condition of the equipment.

In an embodiment, a confidence level for the variant wear rate itself may also be calculated and further influence the generation of further variant wear rates as additional sound data is analyzed. For example, if additional current wear states are estimated over time and are reasonably consistent with the predicted rates of wear, the confidence level in the currently estimated variant wear rate may be relatively high. On the other hand, if a series of estimated current wear states do not fall along the predicted wear rate curve, this may be an indicator that predictions for the selected device have a correspondingly low confidence level. This may particularly be true where the monitored wear rate is inconsistent, i.e., faster than expected in some iterations and slower than expected in others.

Referring again to the method 200 of FIG. 2, in step 208 system outputs corresponding to a current wear state estimation (e.g., estimated percentage of life remaining for the selected device) and/or a sound signature associated with the selected device and comprising one or more of the aforementioned tags where appropriate may further be generated for display to a user via, e.g., a user interface generated on an endpoint computing device 130. The existence of one of more of these tags can be used as supplemental indicators to the user regarding the variant wear state and corresponding likelihood of the selected electromechanical device (or portions thereof) wearing faster than the estimated current wear state (collective PLR for the equivalent sound energy population value).

In some embodiments, a variant wear rate curve may alternatively or additionally be visually represented to users, optionally in combination with previously rendered wear rate curves as an indicator of the wear evolution for the selected device.

If a relatively low confidence level is determined for the variant wear rate curve and/or any associated tags, this may also be indicated visually. For example, numeric values such as percentages corresponding with confidence levels may be displayed alongside appropriate indicators or curves. As another example, various indicators or curves may be color-coded or otherwise selectively presented to users based on associated confidence levels.

Alternatively, newly estimated variant wear rate curves and/or tags may only be selectively displayed to users or implemented for other outputs if the corresponding confidence level meets or exceeds a predetermined threshold.

In various embodiments or for example as pertaining to different types of equipment or use conditions, not all tags may necessarily have equal meaning or weight, but combinations of values and tags may be beneficially implemented to add useful insights for a predictive model. In step 209, embodiments of a system as disclosed herein may iteratively develop and use such models to combine these tags into an automated evaluation process further defining the overall "risk" or condition of the equipment relative to others in the same comparative set. Predictive tools may estimate the quickening or slowing pace of wear in the selected device, and further determine the presence of an intervention event or predict when such an intervention event will take place. System outputs in the form of alerts, messages, and the like may be provided to one or more users in concert with estimated intervention events. In certain embodiments, where for example the particular intervention event may be programmed as requiring immediate attention, such messages may be routed from initial recipient users to secondary recipients based on initial recipient user selection, or based upon a lack of confirmation from the initial recipient user selection.

An intervention event may for example include replacement of the selected device or one or more components thereof, or various forms of preventative maintenance to be provided therefor, or any other wear-based operations as may be appreciated by one of skill in the art. For example, based on the initial specifications (e.g., wear rate) for the selected device, initial dates may be estimated for preventative maintenance and eventually replacement of the device. Based on the estimation of variant wear rates as disclosed herein, these initial dates may dynamically be modified over time and implemented to automatically notify users of intervention events that would otherwise require manual recognition based on the indicators alone.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The term "communications network" as used herein with respect to data communication or exchange between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISPs), and intermediate communication interfaces.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A system for empirical analysis of remaining life in electromechanical devices, the system comprising:
    one or more sensors configured to generate signals representing sound energy emitted by electromechanical devices when positioned in association therewith;
    data storage having stored therein digital sound data corresponding to generated signals for each of a plurality of electromechanical devices;
    at least one server functionally linked to the one or more sensors and the data storage, and configured to iteratively develop one or more models to classify sound characteristics and their corresponding impact on wear rate over time, based at least in part on recurring analysis of the stored sound data with respect to observed intervention events and/or user input relating thereto;
    wherein the at least one server is further configured, for a selected electromechanical device, to:
        estimate, using at least one of the models, a wear state of the selected electromechanical device based on a comparison of current sound energy emitted therefrom with respect to sound data for a comparable group of electromechanical devices,
        ascertain whether one or more of the classified sound characteristics are present in digital sound data corresponding to the selected electromechanical device,
        ascertain a variant wear rate for the selected electromechanical device based on one or more classified sound characteristics ascertained as being present in the digital sound data corresponding thereto,
        determine a confidence level with respect to the ascertained variant wear rate and/or the ascertained presence of one or more of the classified sound characteristics in the digital sound data corresponding thereto, and
        selectively generate one or more output signals upon the confidence level reaching and/or exceeding a predetermined confidence threshold, wherein the one or more output signals are provided to alert and/or initiate a response corresponding to a predicted intervention event associated with the variant wear rate and/or a change in predicted wear state.

2. The system of claim 1, wherein:
    a plurality of groups of electromechanical devices are determined at least in part based on magnitude of sound energy emitted therefrom, and
    the server is configured for the selected electromechanical device to estimate the wear state based on a comparison of a magnitude of the current sound energy emitted therefrom with respect to the magnitudes of sound data for the comparable group of electromechanical devices.

3. The system of claim 2, wherein:

the wear state corresponds to a predicted life remaining for the selected electromechanical device.

4. The system of claim 1, wherein:

the one or more output signals are provided to generate visual indicators associated with the digital sound data and representative of the ascertained one or more of the classified sound characteristics.

5. A method for empirical analysis of remaining life in electromechanical devices, the method comprising:

receiving and storing respective digital sound data corresponding to sound energy emitted by each of a plurality of electromechanical devices;

iteratively developing one or more models to classify sound characteristics and their corresponding impact on wear rate over time, based at least in part on recurring analysis of the stored sound data with respect to observed intervention events and/or user input relating thereto; and for a selected electromechanical device:

estimating, using at least one of the models, a wear state based on a comparison of current sound energy emitted therefrom with respect to sound data for a comparable group of electromechanical devices;

ascertaining whether one or more of the classified sound characteristics are present in digital sound data corresponding to the selected electromechanical device;

ascertaining a variant wear rate for the selected electromechanical device based on one or more classified sound characteristics ascertained as being present in the digital sound data corresponding thereto;

determining a confidence level with respect to the ascertained variant wear rate and/or the ascertained presence of one or more of the classified sound characteristics in the digital sound data corresponding thereto; and selectively generating one or more output signals upon the confidence level reaching and/or exceeding a predetermined confidence threshold, wherein the one or more output signals are provided to alert and/or initiate a response corresponding to a predicted intervention event associated with the variant wear rate and/or a change in predicted wear state.

6. The method of claim 5, comprising:

determining a plurality of groups of electromechanical devices at least in part based on magnitude of sound energy emitted therefrom; and estimating the wear state for the selected electromechanical device based on a comparison of a magnitude of the current sound energy emitted therefrom with respect to the magnitudes of sound data for the comparable group of electromechanical devices.

7. The method of claim 6, wherein:

the wear state corresponds to a predicted life remaining for the selected electromechanical device.

8. The method of claim 5, wherein:

the one or more output signals are provided to generate visual indicators associated with the digital sound data and representative of the ascertained one or more of the classified sound characteristics.

* * * * *